(12) United States Patent
Sarikaya et al.

(10) Patent No.: US 10,162,813 B2
(45) Date of Patent: Dec. 25, 2018

(54) DIALOGUE EVALUATION VIA MULTIPLE HYPOTHESIS RANKING

(71) Applicant: Microsoft Technology Licensing, LLC, Redmond, WA (US)

(72) Inventors: Ruhi Sarikaya, Redmond, WA (US); Daniel Boies, Saint-Lambert (CA); Paul A. Crook, Bellevue, WA (US); Jean-Philippe Robichaud, Montreal (CA)

(73) Assignee: Microsoft Technology Licensing, LLC, Redmond, WA (US)

(*) Notice: Subject to any disclaimer, the term of this patent is extended or adjusted under 35 U.S.C. 154(b) by 579 days.

(21) Appl. No.: 14/086,897

(22) Filed: Nov. 21, 2013

(65) Prior Publication Data
US 2015/0142420 A1    May 21, 2015

(51) Int. Cl.
  G10L 15/22    (2006.01)
  G06F 17/27    (2006.01)
  G10L 15/18    (2013.01)

(52) U.S. Cl.
  CPC ........ *G06F 17/279* (2013.01); *G10L 15/1815* (2013.01); *G10L 15/22* (2013.01);
  (Continued)

(58) Field of Classification Search
  CPC ...................................................... G10L 15/22
  (Continued)

(56) References Cited

U.S. PATENT DOCUMENTS 5,293,584 A    3/1994    Brown et al.
5,477,451 A    12/1995    Brown et al.
(Continued)

FOREIGN PATENT DOCUMENTS

EP    1701247        9/2006
EP    1701247  A2 *  9/2006   ............. G06F 3/167
(Continued)

OTHER PUBLICATIONS

Bernd Souvignier et al., The Thoughtful Elephant: Strategies for Spoken Dialog Systems, IEEE Transactions on Speech and Audio Processing, IEEE Service Center, NY, NY, US, Jan. 1, 2000.
(Continued)

*Primary Examiner* — Michael N Opsasnick

(57) ABSTRACT

In language evaluation systems, user expressions are often evaluated by speech recognizers and language parsers, and among several possible translations, a highest-probability translation is selected and added to a dialog sequence. However, such systems may exhibit inadequacies by discarding alternative translations that may initially exhibit a lower probability, but that may have a higher probability when evaluated in the full context of the dialog, including subsequent expressions. Presented herein are techniques for communicating with a user by formulating a dialog hypothesis set identifying hypothesis probabilities for a set of dialog hypotheses, using generative and/or discriminative models, and repeatedly re-ranks the dialog hypotheses based on subsequent expressions. Additionally, knowledge sources may inform a model-based with a pre-knowledge fetch that facilitates pruning of the hypothesis search space at an early stage, thereby enhancing the accuracy of language parsing while also reducing the latency of the expression evaluation and economizing computing resources.

20 Claims, 8 Drawing Sheets

(52) U.S. Cl.
CPC .... *G10L 15/1822* (2013.01); *G10L 2015/227* (2013.01); *G10L 2015/228* (2013.01)

(58) Field of Classification Search
USPC .......................................................... 704/9
See application file for complete search history.

(56) References Cited

U.S. PATENT DOCUMENTS

| | | | |
|---|---|---|---|
| 6,122,361 | A | 9/2000 | Gupta |
| 6,631,346 | B1 | 10/2003 | Karaorman et al. |
| 7,010,484 | B2 | 3/2006 | Lin |
| 7,363,215 | B1 * | 4/2008 | Jamieson ............ G06F 17/2785 704/10 |
| 8,239,207 | B2 | 8/2012 | Seligman et al. |
| 8,275,615 | B2 | 9/2012 | Kozat et al. |
| 8,521,526 | B1 * | 8/2013 | Lloyd ................... G10L 15/197 704/236 |
| 2001/0041980 | A1 | 11/2001 | Howard et al. |
| 2003/0200094 | A1 | 10/2003 | Gupta et al. |
| 2003/0233230 | A1 * | 12/2003 | Ammicht .............. G10L 15/183 704/235 |
| 2004/0078201 | A1 | 4/2004 | Porter et al. |
| 2006/0004570 | A1 | 1/2006 | Ju et al. |
| 2006/0085192 | A1 * | 4/2006 | Davis ...................... G10L 15/22 704/257 |
| 2008/0281598 | A1 | 11/2008 | Eide et al. |
| 2009/0018833 | A1 | 1/2009 | Kozat et al. |
| 2010/0138215 | A1 | 6/2010 | Williams |
| 2012/0078888 | A1 | 3/2012 | Brown |
| 2012/0179467 | A1 | 7/2012 | Williams |
| 2012/0265518 | A1 | 10/2012 | Lauder |
| 2013/0018876 | A1 | 1/2013 | Chu-Carroll |
| 2014/0163959 | A1 | 6/2014 | Hebert et al. |
| 2014/0222422 | A1 | 8/2014 | Sarikaya et al. |
| 2015/0142420 | A1 | 5/2015 | Sarikaya et al. |
| 2016/0350288 | A1 | 12/2016 | Wick |
| 2017/0061956 | A1 | 3/2017 | Sarikaya et al. |

FOREIGN PATENT DOCUMENTS

| | | | |
|---|---|---|---|
| EP | 2575128 | 4/2013 | |
| WO | WO 94/28541 | 12/1994 | |
| WO | WO 99/44154 | 9/1999 | |
| WO | WO 9944154 A1 * | 9/1999 | ........... G06F 9/4446 |

OTHER PUBLICATIONS

Kazunori Komatani School of Informatics et al., "Generating Effective Confirmation and Guidance Using Tw-Level Confidence Measures for Dialog Systems", Oct. 16, 2000.

PCT International Search Report and Written Opinion in International Application PCT/US2014/066253, dated Apr. 21, 2015, 20 pgs.

PCT 2nd Written Opinion in International Application PCT/US2014/066253, dated Dec. 4, 2015, 7 pgs.

Jonson, Rebecca; "Dialogue Context-Based Re-Ranking of ASR Hypotheses", in proceedings of IEEE Spoken Language Technology Workshop. http://ieeexplore.ieee.org/stamp/stamp.jsp?tp=&arnumber=4123390 Published Date: Dec. 10, 2006 pp. 4.

Wu, Hsu-Chih, et al; "Reducing Recognition Error Rate Based on Context Relationships among Dialogue Turns", in proceedings of 8th Annual Conference of the International Speech Communication Association. http://groups.csail.mit.edu/sls//publications/2007/HCWuPaper.pdf Published Date: Aug. 2007 pp. 4.

Lemon, Oliver, et al; "User Simulations for Context-Sensitive Speech Recognition in Spoken Dialogue Systems", in proceedings of the 12th Conference of the European Chapter of the ACL. http://aclweb.org/anthology/E/E09/E09-1058.pdf Published Date: Mar. 30, 2009 pp. 9.

Cuayahuitl, Heriberto, et al.; "Impact of ASR N-Best Information on Bayesian Dialogue Act Recognition" in Proceedings of the SIGDIAL Conference, http://aclweb.org/anthology/W/W13/W13-4047.pdf Published Date: Aug. 22, 2013 pp. 5.

Jonson, Rebecca; "Context-based Re-ranking and Grounding Classification of N-Best Hypotheses" http://www.ling.gu.se/~rj/nbestclass.pdf Published Date: Jan. 8, 2007 pp. 11.

Ballim, Afzal, et al: "Semantic Filtering by Inference on Domain Knowledge in Spoken Language Dialogue Systems" in Second International Conference on Language Resources and Evaluation http://arxiv.org/ftp/cs/papers/0410/0410060.pdf Published Date: May 31, 2000 pp. 6.

Gabsdil, Matle, et al; "Combining Acoustic and Pragmatic Features to Predict Recognition Performance in Spoken Dialogue Systems", in Proceedings of 42nd Annual Meeting on Association for Computational Linguistics http://homepages.inf.ed.ac.uk/olemon/acl04.pdf Published Date: Jul. 2004 pp. 8.

Lemon, Oliver, et al; "Machine Learning for Spoken Dialogue Systems", in proceedings of European Conference on Speech Communication and Technologies. http://hal-supelec.archives-ouvertes.fr/docs/00/21/60/35/PDF/Supelec270.pdf Published Date: Aug. 2007 pp. 4.

Jonson, Rebecca, et al; "Information State Based Speech Recognition", in Doctoral thesis https://gupea.ub.gu.se/bitstream/2077/22169/4/gupea_2077_22169_4.pdf Published Date: May 2010 pp. 327.

Basili, et al., "Kernel-Based Discriminative Re-ranking for Spoken Command Understanding in HRI", in Proceedings of XIIIth International Conference of the Italian Association for Artificial Intelligence, Dec. 4, 2013, 4 pages.

Burges, et al., "Learning to Rank Using an Ensemble of Lambda-Gradient Models", in Journal of Machine Learning Research: Workshop and Conference, vol. 14, Feb. 2011, pp. 25-35.

Cohen, et al., "Towards a Universal Speech Recognizer for Multiple Languages", in Proceedings of the IEEE Workshop on of the Automatic Speech Recognition and Understanding, Dec. 14, 1997, pp. 591-598.

Cortes, et al., "Support-Vector Networks", in Journal of Machine Learning, vol. 20, Issue 3, Sep. 15, 1995, pp. 273-297.

Dinarelli, et al., "Discriminative Reranking for Spoken Language Understanding", in Journal of IEEE Transactions on Audio, Speech and Language Processing, vol. 20, Issue 2, Feb. 2012, pp. 526-539.

Dinarelli, et al., "Hypotheses Selection Criteria in a Reranking Framework for Spoken Language Understanding", in Proceedings of Conference on Empirical Methods in Natural Language Processing, Jul. 27, 2011, pp. 1104-1115.

Hahn, et al., "Comparing Stochastic Approaches to Spoken Language Understanding in Multiple Languages", in IEEE Transactions on Audio, Speech, and Language Processing, vol. 19 , Issue 6, Aug. 2011, pp. 1569-1583.

Henderson, et al., "The Second Dialog State Tracking Challenge", in Proceedings of SIGDIAL Conference, Jun. 18, 2014, pp. 263-272.

Lafferty, et al., "Conditional Random Fields: Probabilistic Models for Segmenting and Labeling Sequence Data", in Proceedings of Eighteenth International Conference on Machine Learning, Jun. 28, 2001, 10 pages.

Morbini, et al., "A Reranking Approach for Recognition and Classification of Speech Input in Conversational Dialogue Systems", in Proceedings of IEEE Spoken Language Technology Workshop, Dec. 2, 2012, pp. 49-54.

Ng, et al., "Dialog Input Ranking in a Multi-Domain Environment Using Transferable Belief Mode", in Proceedings of 4th SIGDIAL Workshop on Discourse and Dialogue, Jul. 5, 2003, 5 pages.

Robichaud, et al., "Hypotheses Ranking for Robust Domain Classification and Tracking in Dialogue Systems", in Proceedings of 15th Annual Conference of the International Speech Communication Association, Sep. 2014, 5 pages.

Williams, Jason D., "Web-Style Ranking and SLU Combination for Dialog State Tracking", in Proceedings of SIGDIAL Conference, Jun. 18, 2014, pp. 282-291.

Xu, et al., "Contextual Domain Classification in Spoken Language Understanding Systems using Recurrent Neural Network", in Proceedings of IEEE International Conference on Acoustics, Speech and Signal Processing, May 4, 2014, 5 pages.

(56) References Cited

OTHER PUBLICATIONS

PCT International Preliminary Report on Patentability in International Application PCT/US2016/049338, dated Nov. 25, 2016, 16 pgs.
Crook, Paul A., et al., "Multi-Language Hypotheses Ranking and Domain Tracking for Open Domain Dialogue Systems", Proceedings of the 16th Annual Conferenceof the International Speech Communication Association (Interspeech 2015),Sep. 6, 2015, pp. 1810-1814, Dresden, Germany, 5 pgs.
Fishel, Mark, "Ranking translations using error analysis and quality estimation", Proceedings of the Eighth Workshop on Statistical Machine Translation, Aug. 8, 2013, pp. 405-407, 3 pgs.
PCT 2nd Written Opinion in International Application PCT/US2016/049338, dated Aug. 4, 2017, 11 pages.
U.S. Appl. No. 14/841,156, Office Action dated Jun. 20, 2017, 22 pages.
PCT International Preliminary Report on Patentability in Application PCT/US2016/049338, dated Dec. 11, 2017, 11 pages.
U.S. Appl. No. 14/841,156, Amendment and Response filed Sep. 20, 2017, 16 pages.
U.S. Appl. No. 14/841,156, Office Action dated Feb. 23, 2018, 24 pages.
"Non-Final Office Action Issued in U.S. Appl. No. 14/841,156", dated Aug. 7, 2018, 21 Pages.

* cited by examiner

DIALOGUE EVALUATION VIA MULTIPLE HYPOTHESIS RANKING

BACKGROUND

Within the field of computing, many scenarios involve the evaluation of a dialogue between a user and a device in order to identify and fulfill the requests of a user. For example, speech-to-text systems may be developed and applied to translate a verbal expression into a formal request, and the results may be provided in the form of speech rendered by a text-to-speech engine. Many such evaluation techniques may be devised and utilized, including those that include a speech recognizer that identifies spoken words, and/or a language parser that arranges the recognized words into parts of speech and phrases that conform with the standards of the spoken language, in order to achieve an automated understanding of the user's request.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

The accuracy and/or capabilities of expression-based user interfaces may be enhanced by incorporating more sophisticated expression evaluation techniques. As a first such example, many expression evaluation techniques are configured to recognize collections of spoken words; to identify possible translations of the spoken words according to a language model with a score representing an accuracy probability; and to select, among competing translations, the highest-probability translation for further evaluation. Subsequently received expressions are then evaluated in the context of the highest-probability translation of the earlier expression. However, such selection may not be configured to continue tracking the accuracy probability of a second possible translation that may initially have a lower accuracy probability, but that may exhibit growing accuracy probability in the context of the subsequently received expressions. For example, a user may submit an ambiguous query, but may later request a modification of the query, e.g., by indicating that the device has chosen incorrectly among two possible translations of the user's expression, or by changing the subjects of an otherwise static request (e.g., requesting a list of movies in a particular movie genre, and then asking to restrict the request with a range of release dates). If the device does not continue tracking lower-probability but nevertheless possible translations, the system may demonstrate an impairment of understanding the context of the continuing dialogue with the user.

As a second such example, the propagation of information between stages in a multi-stage dialogue evaluation system may be difficult to implement in a flexible but also efficient manner. In particular, some techniques may utilize knowledge sources to enable a selection among possible translations, but limiting the use of knowledge sources at such a comparatively late stage in the translation process may not take full advantage of such information. Instead, a model-based carry-over technique may be implemented that utilizes the knowledge source at an earlier stage, and that formulates, estimates, and/or compares dialogue hypotheses using a generative and/or discriminative hypothesis modeling. Techniques designed in this manner may be capable of reducing the set of dialogue hypotheses under comparison and/or adjusting the hypothesis probabilities of the dialog hypotheses in view of domain-based knowledge.

Presented herein are techniques for evaluating a dialogue with a user. An embodiment of such techniques may enable communication with a user of a device by generating a dialogue hypothesis set comprising at least two dialogue hypotheses respectively having a hypothesis probability; ranking the dialogue hypothesis set according to the hypothesis probabilities; after the ranking, upon identifying a low-ranking dialogue hypothesis having a hypothesis probability below a hypothesis retention threshold, discarding the low-ranking dialogue hypothesis; after the discarding, using a knowledge source, adjusting the hypothesis probabilities of the respective dialogue hypotheses; after the adjusting, re-rank the dialogue hypothesis set according to the hypothesis probabilities; and, for a high-ranking dialogue hypothesis having a hypothesis probability exceeding a hypothesis confidence threshold, executing an action fulfilling the high-ranking dialogue hypothesis.

Another embodiment of the techniques presented herein may enable communication with a user of a device by generating a dialogue hypothesis set; based on respective expressions of the user within the dialog, apply an expression recognizer and a natural language processor to store in the dialogue hypothesis set at least one dialogue hypothesis of the expression; for the previous dialogue hypotheses in the dialogue hypothesis set that were generated for a previous expression of the dialogue, updating the subject of the at least one slot of the previous dialogue hypothesis; using a knowledge source, adjusting the hypothesis probabilities of the respective dialogue hypotheses; ranking the dialogue hypothesis set according to the hypothesis probabilities; and, for a high-ranking dialogue hypothesis having a hypothesis probability exceeding a hypothesis confidence threshold, executing an action fulfilling the high-ranking dialogue hypothesis. These and other embodiments and variations of such technique are presented herein.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
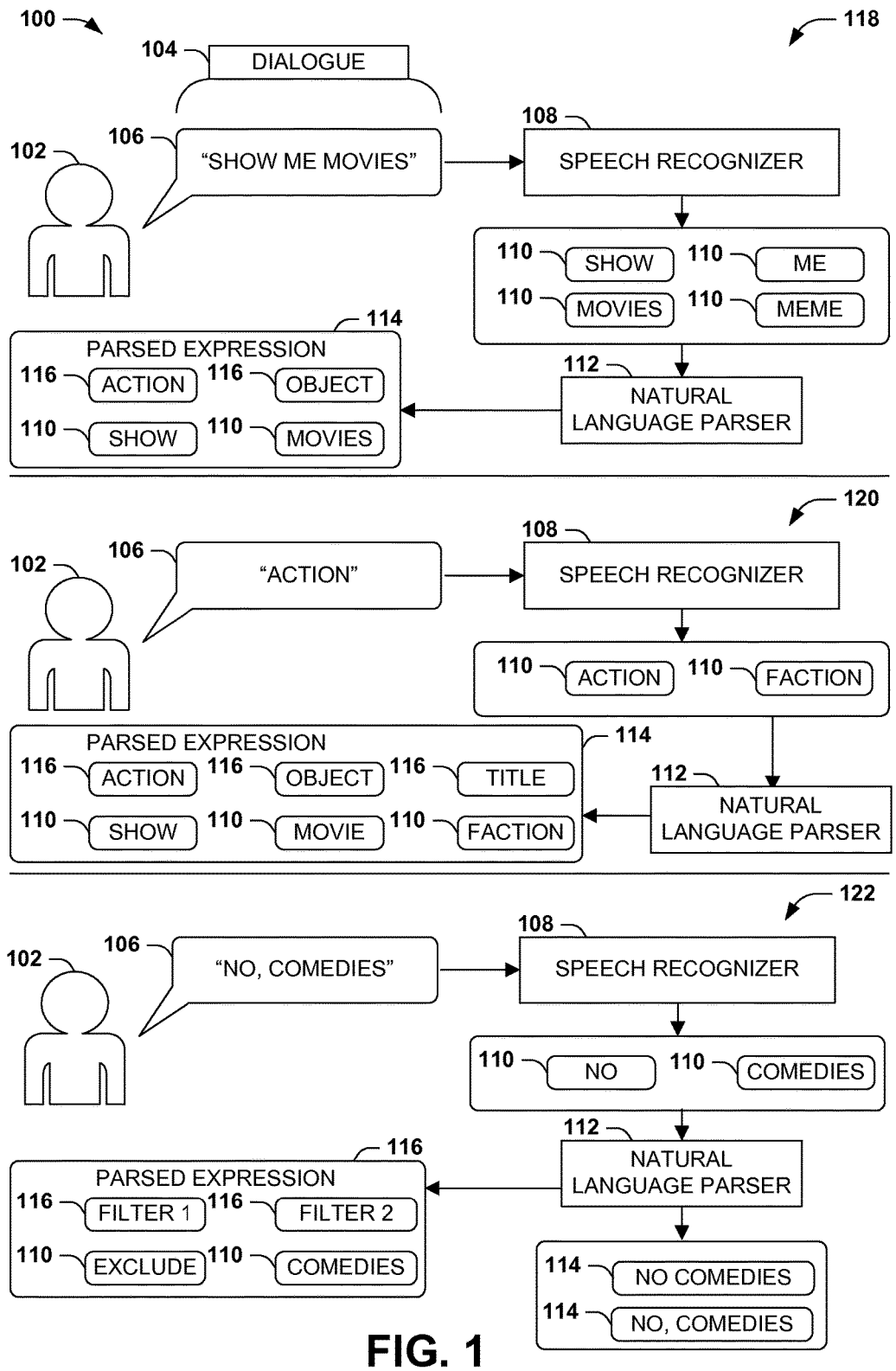
FIG. 1 is an illustration of an exemplary scenario featuring an evaluation of an dialogue with a user.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

A. INTRODUCTION

FIG. 1 is an illustration of an exemplary scenario 100 featuring an exemplary technique for evaluating a dialogue between a device and a user 102. In this exemplary scenario 100, upon detecting an expression 106 spoken by the user 102 as part of a dialogue 104, the device utilizes a speech recognizer 108 to recognize the words 110 of the expression 106, and a natural language parser 112 to translate the expression 106 into a parsed expression 114. Such parsing may be applied to each expression 106 received from the user 102 in a sequence comprising a multi-turn dialogue 104.

As further illustrated in the exemplary scenario 110 of FIG. 1 at a first time point 118, the user 102 initiates a new dialogue 104 with the device by speaking the expression 106 "show me movies." The speech recognizer 108 receives a recording of the expression 106 (such as "show," "me," and "movies," as well as possibly incorrect recognized words 110, such as "meme," recognized as the word "me" and the leading portion of the word "movies"). A natural language parser 112 may endeavor to arrange the identified words 110 into a parsed expression 114, such as by matching the identified words 110 with a part of speech 116 in a known model of a phrase in the language spoken by the user 102. In this manner, the device may recognize the expression 106 of the user 102 as a request to show movies of some type.

At a second time point 120, the user 102 may speak a second expression 106, including only the term "action." The speech recognizer 108 may again be applied, thus recognizing the expression 106 as either the word "action," or as the term "faction," which may (e.g.) refer to a movie having this title. The natural language parser 112 may use various determinative criteria to select the term "faction" as more probable than the word "action" (e.g., a popular movie named Faction may currently be playing in theaters). Additionally, the natural language parser 112 may combine the term "faction" as an additional term with the previously evaluated parsed expression 114, and may conclude that the user 102 is asking to see the movie Faction. However, this evaluation may result in an error due to the incorrectly recognized word 110 of the expression 106.

At a third time 122, the user 102 may perceive the source of the error, and may attempt to correct it by specifying a different genre (e.g., speaking the express 106 "no, comedies"), intended as a contrast with the previous request for movies in the "Action" genre. Accordingly, the speech recognizer 108 may identify the individual words 110 "no" and "comedies." Viewed in the context of the second parsed expression 114, this expression 106 may be perceived as a request to substitute the genre of "comedies" for the previously specified genre of "action." However, the device may simply evaluate the expression 106 in isolation of the previous expression 106, and may therefore interpret the expression 106 of the user 102 as indicating the opposite request, i.e., to exclude all comedies from a set of movies. Accordingly, the natural language processor 112 may arbitrarily translate the "no comedies" into a set of filters 118 to be applied to a current query (e.g., excluding films in the genre of "comedy" from the result set). In this manner, the device may interact with the user 102 to identify the parsed expressions 116 with a highly probable evaluation of the request spoken by the user 102.

In the exemplary scenario 100 of FIG. 1, the dialogue evaluation system results in an incorrect evaluation of the dialogue 104 of the user 102 for at least several reasons. As a first example, the language evaluation system does not track multiple hypotheses. For example, the word 110 "faction" appeared to be the higher-probability parsed expression 114 at the second time 120, and so was selected for the dialogue 104, while the word 110 "action" was determined to have lower probability and was discarded. However, at the third time point 122, the expression 106 of the user ("no, comedies") has no connection with the word 110 "faction," but is semantically related with the word 110 "action" as an indication of an alternative genre selection. The connection may have been revealed by tracking the word 110 "action" as a lower but nevertheless plausible probability, but instead is lost, resulting in a loss of information for disambiguating the expression 106 at the third time point 122. That is, in this exemplary scenario 100, there is no way to reevaluate a first expression 106 in the context of a subsequent expression. As a second example, the language evaluation system is incapable of disambiguating the phrases "no comedies" and "no, comedies" while associating the words 110 with the parts of speech 116. This inability results from a lack of semantic guidance as to the carry-over model; e.g., the language evaluation system has no source of information as to patterns of language that may enable an assessment of the probabilities of various translations 114 in the context of the dialogue 104. For at least these reasons, the language evaluation system in the exemplary scenario of FIG. 100 demonstrates inadequate proficiency in evaluating the dialogue 104 with the user 102.

B. PRESENTED TECHNIQUES

Presented herein are techniques that may facilitate the evaluation of a dialogue 104 with a user 102 in order to fulfill the requests expressed therein.

In accordance with these techniques, for the respective expressions 106 of the dialogue 104, a set of dialogue hypotheses are identified and tracked, along with a hypothesis probability of the respective dialogue hypotheses. Such tracking may enable a retroactive identification of and recovery from a language ambiguity in a preceding expression 106; e.g., past preceding expressions 106 may later be reinterpreted in the context of later expressions 106, and paths of dialogue 104 that appeared less probable earlier in the dialogue 104 before may end up having a higher, and perhaps highest, probability in the dialogue hypothesis set. As a second example, the carry-over effect of parsed expressions 114 for clarification, modification, and/or reversal by later expressions 106 may be guided by a model-based system. Various techniques, including carefully tailored rules, machine-based learning using annotated training sets, and combinations thereof, may be used to develop carry-over models reflecting typical patterns of dialogue 104 in a particular language, and the use of such model-based carry-over techniques may promote the accurate determination of hypothesis probabilities.

Figure 2:
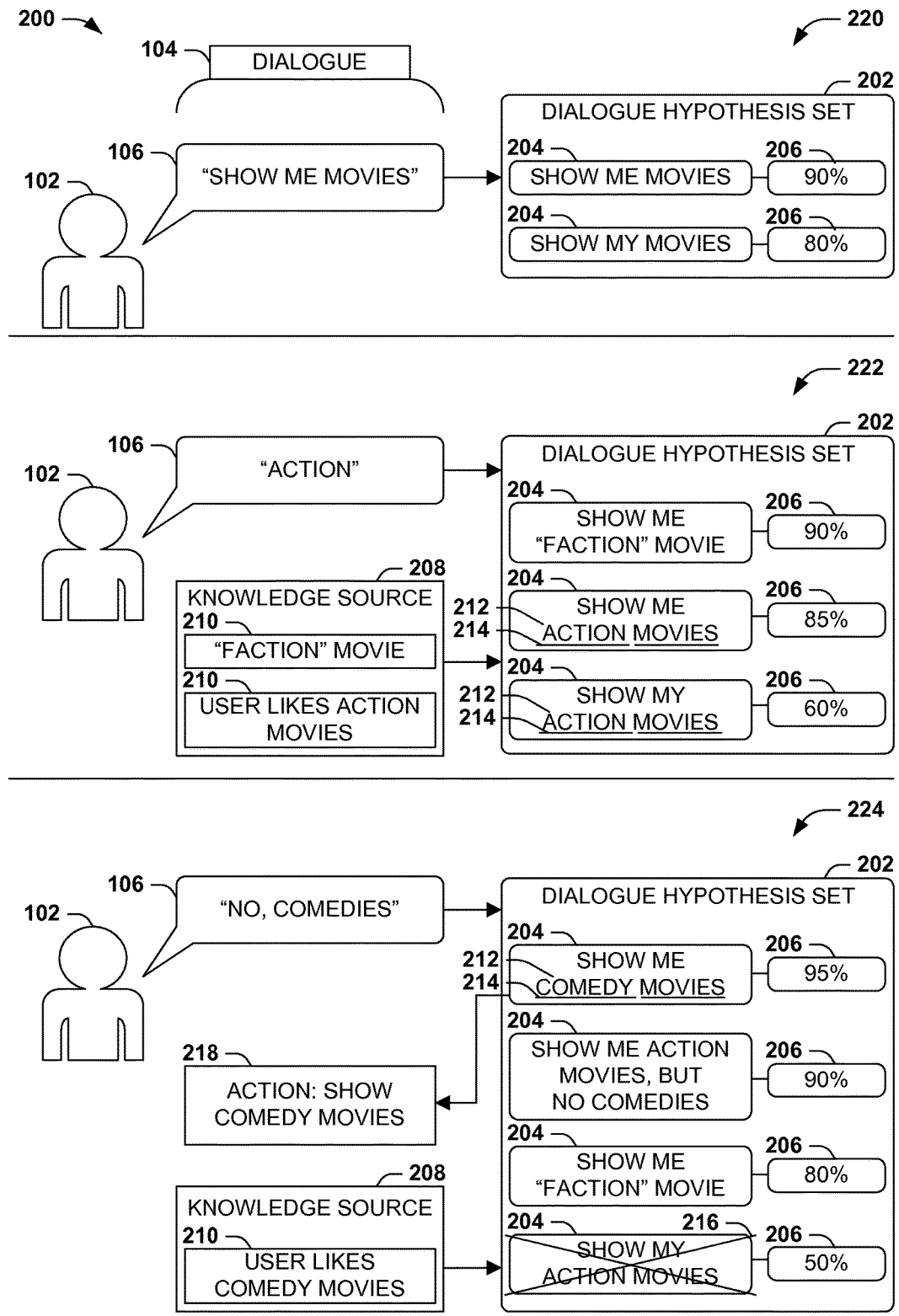
FIG. 2 is an illustration of an exemplary scenario featuring an evaluation of an dialogue with a user in accordance with the techniques presented herein.

FIG. 2 presents an illustration of an exemplary scenario 200 featuring the evaluation of a dialogue 104 in accordance with the techniques presented herein. In this exemplary scenario 200, a user 102 engages in dialogue 104 with a device through a sequence of expressions 106 that are respectively evaluated by developing a dialogue hypothesis set 202, comprising a set of dialogue hypotheses 204 respectively having a hypothesis probability 206 as an estimate of the accurate interpretation of the dialogue 104.

As illustrated in the exemplary scenario 200 of FIG. 2, at a first time point 220, the user 102 speaks the expression 106 "show me movies," which the language evaluation system interprets as one of two dialogue hypotheses 204: "show me movies" (having a higher hypothesis probability 206), and an alternative dialogue hypothesis 204 "show my movies," having a less probable but nevertheless plausible hypothesis probability 206. While the dialogue hypothesis 204 having the higher hypothesis probability 206 may be tentatively accepted, the lower-probability dialogue hypothesis 204 is retained in the dialogue hypothesis set 202.

At a second time 222, the user 102 next speaks the expression 106 "action." A knowledge source 208 is accessed for assistance with interpreting the expression 106 in the context of the dialogue 104, and the knowledge source 208 provides two relevant facts 210: that a movie entitled "Faction" is now popular, and that the user 102 appreciates movies in the "action" genre. Accordingly, the hypothesis probabilities 206 of the previous dialogue hypotheses 204 that are already in the dialogue hypothesis set 202 are updated to reflect both the second expression 106 and the related facts 210 in the knowledge source 208. In particular, the word 110 "action" is inserted as a subject 214 into a slot 212 of the previous dialogue hypothesis 204 "show me movies," as the language model may indicate that a noun describing a type of content (such as a movie) may be preceded by an adjective describing a genre of such movies (such as the action genre). While this dialogue hypothesis 204 remains highly probable, it may be determined to be less probable than a new dialogue hypothesis 204 relating to the Faction movie, and/or may be determined to be an unusual pattern of dialogue. Accordingly, the hypothesis probability 206 of the "show me action movies" dialogue hypothesis 204 may be marginally reduced, while a new dialogue hypothesis 204 may be added for the expression "show me the movie called Faction," with a high hypothesis probability 206. Conversely, the second previous hypothesis dialogue 204 for the phrase "show my movies" may be determined to be less probably interpreted as the updated expression 106 "show my action movies," less in accordance with typical dialogue patterns according to a carry-forward model, and/or unsupported by the knowledge source 208 (e.g., the user 102 may not have any personal movies matching the adjective "action"). Accordingly, the hypothesis probability 206 of this dialogue hypothesis 204 may be further reduced. The dialogue hypotheses 204 of the dialogue hypothesis set 202 are then re-ranked according to the updated hypothesis probabilities 206 after adjustment in view of the knowledge source 208. Again, the dialogue hypothesis 204 having the highest hypothesis probability 206 in the dialogue hypothesis set 202 may be tentatively accepted, but the lower-probability dialogue hypotheses 204 may be retained in the dialogue hypothesis set 202 for further evaluation.

At a third time point 224, the user 102 may speak this expression 106 "no, comedies." This expression 106 may be evaluated in the context of the knowledge source 208, which may reveal that the user 102 also likes comedy movies 210. Additionally, the context of this third expression 106 in the context of the dialogue hypothesis set 202 may be highly correlated with the previous dialogue hypothesis 204 of "show me action movies," since it appears highly probable that the user 102 is asking to change a previously specified genre of movies. Accordingly, after updating the slots 212 of the dialogue hypothesis 204 from the current subject 214 of "action" to the updated subject 214 of "comedy," the hypothesis probability 206 of this dialogue hypothesis 204 is increased to reflect the contextual consistency of the sequence of expressions 106 in the dialogue 104 (e.g., the pairs of expressions 106 reflect natural and typical transitions therebetween according to the language model). Additionally, a new dialogue hypothesis 204 may also be inserted into the dialogue hypothesis set 202 for the expression 106 "no comedies" (indicating that the user 102 only wishes to view action movies that are not also comedies). The carry-over model may indicate that this dialogue hypothesis 204 is less probable (e.g., that users 102 infrequently request filtered sets of movies through this pattern of expressions 106), and may therefore provide a lower but nevertheless high hypothesis probability 206 to this new dialogue hypothesis 204.

As further illustrated at the third time point 224 in the exemplary scenario 200 of FIG. 2, the other previous dialogue hypotheses 204 may be determined to be less probable in the context of the third expression 106 (e.g., it may not be possible to determine a significant nexus between the dialogue hypothesis 204 and the current expression 106), and the hypothesis probabilities 206 of these previous dialogue hypotheses 204 may be significantly reduced. Accordingly, the dialogue hypotheses 204 of the dialogue hypothesis set 202 are now re-ranked according to the updated hypothesis probabilities 206 after adjustment in view of the knowledge source 208. Notably, the hypothesis probability 206 for the dialogue hypothesis 204 "show my action movies" may now appear to be sufficiently reduced (e.g., below a hypothesis retention threshold of 60%) that it is removed 216 from the dialogue hypothesis set 202. Indeed, this adjustment may be determined even before reevaluating this dialogue hypothesis 204 in the context of the knowledge source 208 (e.g., there may be no relevant information that may render this dialogue hypothesis 204 plausible), and the removal may be performed before needlessly reevaluating the dialogue hypothesis 204 with the knowledge source 208, thereby enhancing the efficiency of the evaluation system. Conversely, the hypothesis probability 206 for the highest dialogue hypothesis 204 may now appear to be sufficiently high (e.g., above a hypothesis confidence threshold) to prompt the execution of an action 218 in fulfillment of the dialogue expression 204, such as showing a list of available movies in the comedy genre. Nevertheless, the dialogue hypotheses 204 having lower but still plausible hypothesis probabilities 206 are still retained in the dialogue hypothesis set 202; e.g., the user 102 may subsequently indicate that the highest-probability dialogue hypothesis 204 is incorrect, and that the user 102 actually did intend to request movies that are in the "action" genre and not also in the "comedy" genre.

C. TECHNICAL EFFECTS

As illustrated in the exemplary scenario 200 of FIG. 2, the evaluation of the dialogue 104 using a dialogue hypothesis set 202 may exhibit one or more technical advantages over the dialogue evaluation illustrated in the exemplary scenario 100 of FIG. 1. As a first such example, by developing and tracking a set of dialogue hypotheses 204, including those that are not the highest-probability dialogue hypothesis 204 at a particular time but that may later be reevaluated in the context of later expressions 106, the dialogue evaluation may retroactively discover and recover from language ambiguities. As a second such example, by using a knowledge source 208 in various ways, including during the model-based carry-over wherein previous dialogue hypotheses are updated based on a subsequent expression 106, the dialogue evaluation system more accurately identifies the hypothesis probabilities 206 of the dialogue hypotheses 204. As a third such example, these techniques may be suitable for the formulation, estimation, and/or comparison of dialogue hypotheses using discriminative approaches based on a conditional probability distribution among the dialogue hypotheses 204, and/or using generative approaches involving a joint probability distribution of potential dialogue hypotheses 204. As a fourth such example, by representing the dialogue hypotheses 204 as a collection of slots 212 that may be filled and updated with various subjects 212 (e.g., replacing a first genre of "action" with an updated genre of "comedies"), the language evaluation system enables the clarification, modification, and updating of previous expressions 106 that is consistent with typical speech patterns in the natural language of the user 102 and the dialogue 104. As a fifth such example, by reevaluating the "show my action movies" dialogue hypothesis 204 and removing 216 it from the dialogue hypothesis set 202 even before considering it in the context of the knowledge source 208, the dialogue evaluation system may avoid unhelpful continued evaluation of low-probability dialogue hypotheses 204, thereby economizing the computational resources of the dialogue evaluation system. Such economy may, e.g., reduce the latency of the dialogue evaluation system between receiving the expressions 106 of the user 102 and executing the action 218 for the highest-probability dialogue hypothesis 204. These and other advantages may be achievable through the development and use of dialogue evaluation systems in accordance with the techniques presented herein.

D. EXEMPLARY EMBODIMENTS

Figure 3:
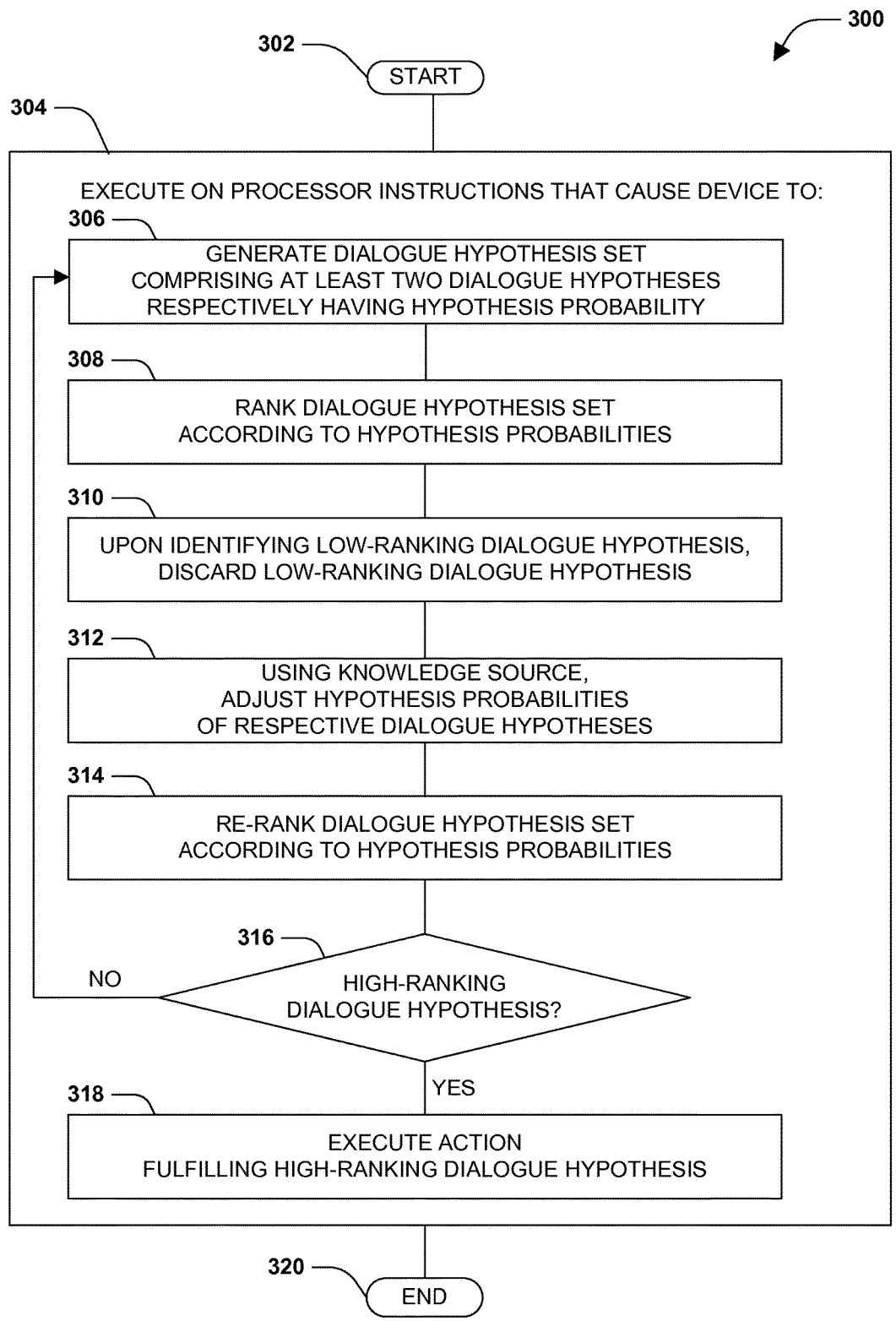
FIG. 3 is an illustration of a first exemplary method of evaluating a dialogue with a user in accordance with the techniques presented herein.

FIG. 3 presents an illustration of an exemplary first embodiment of the techniques presented herein, illustrated as an exemplary method 300 of evaluating a dialogue 104 with a user 102. The exemplary method 300 may be implemented, e.g., as a set of instructions stored in a memory component (e.g., a memory circuit, a platter of a hard disk drive, a solid-state storage device, or a magnetic or optical disc) of a device having a processor, where the instructions, when executed on the processor, cause the device to operate according to the techniques presented herein. The exemplary method 300 begins at 302 and involves executing 304 the instructions on the processor of the device. In particular, the execution of the instructions on the processor causes the device to generate 306 a dialogue hypothesis set 202 comprising at least two dialogue hypotheses 204 respectively having a hypothesis probability 206. The execution of the instructions on the processor also causes the device to rank 308 the dialogue hypothesis set 202 according to the hypothesis probabilities 206 of the respective dialogue hypotheses 204. The execution of the instructions on the processor also causes the device to, after the ranking 308, upon identifying a low-ranking dialogue hypothesis 204 having a hypothesis probability 206 that is below a hypothesis retention threshold, discard 310 the low-ranking dialogue hypothesis 204.

The execution of the instructions on the processor also causes the device to, after the discarding 310, using a knowledge source 208, adjust 312 the hypothesis probabilities 206 of the respective dialogue hypotheses 204. The execution of the instructions on the processor also causes the device to, after the adjusting 312, re-rank 314 the dialogue hypothesis set 202 according to the hypothesis probabilities 206 of the respective dialogue hypotheses 204. The execution of the instructions on the processor also causes the device to determine whether a high-ranking dialogue hypothesis 204 exists that has a hypothesis probability 206 exceeding a hypothesis confidence threshold. If so, the execution of the instructions on the processor may cause the device to execute 318 an action 218 fulfilling the high-ranking dialogue hypothesis 204; and if not, then the device may await an additional expression 106 (optionally prompting the user 102 for additional expressions 106 providing more or clarifying information), and may then return to the generating 306 of dialogue hypotheses 106. By generating and tracking the hypothesis probabilities 206 of a dialogue hypothesis set 202 in this manner, the execution of the instructions on the processor causes the device to evaluate the dialogue 104 with the user 102 in accordance with the techniques presented herein, and so the exemplary method 300 ends at 320.

Figure 4:
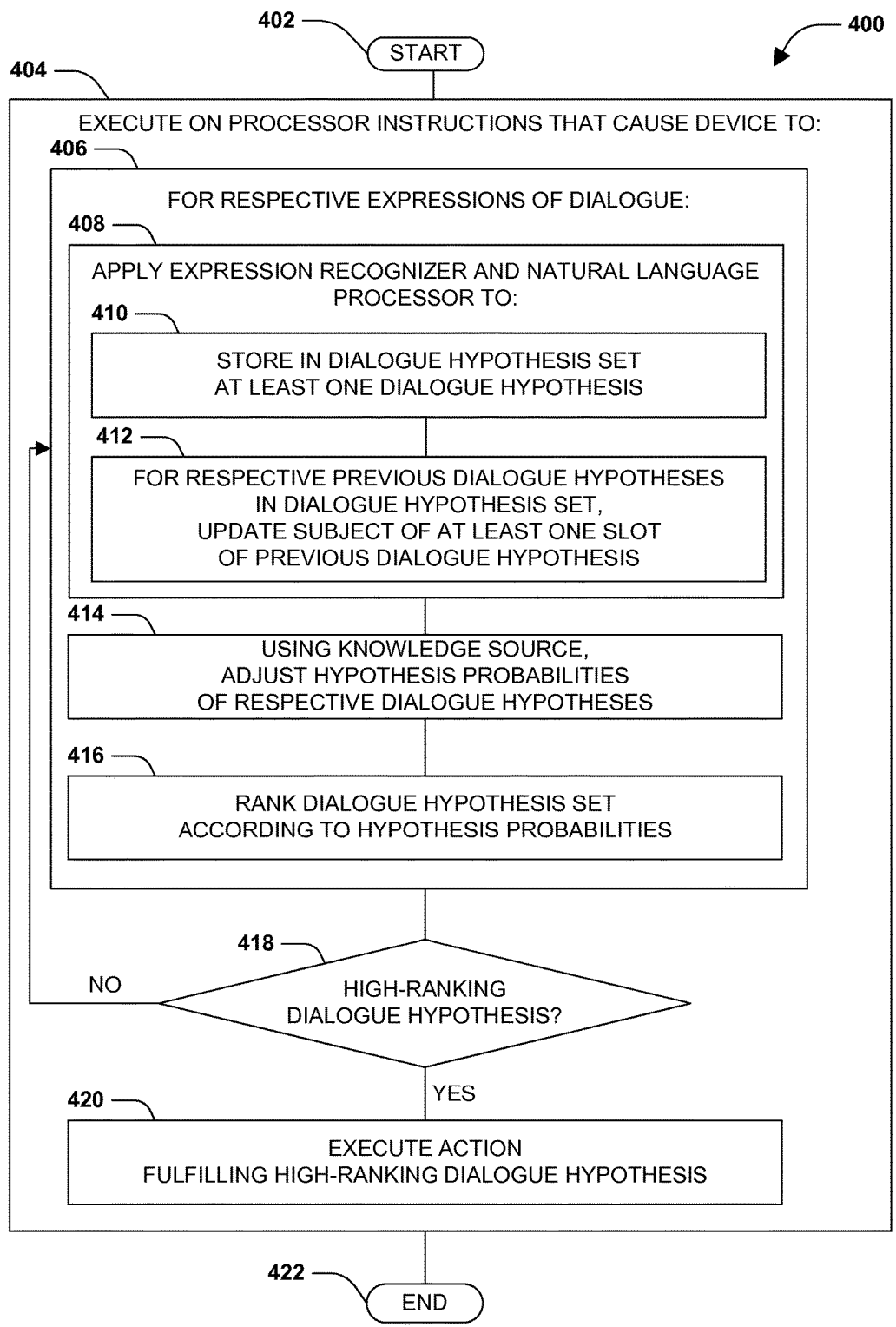
FIG. 4 is an illustration of a second exemplary method of evaluating a dialogue with a user in accordance with the techniques presented herein

FIG. 4 presents an illustration of an exemplary second embodiment of the techniques presented herein, illustrated as an exemplary method 400 of evaluating a dialogue 104 with a user 102. The exemplary method 400 may be implemented, e.g., as a set of instructions stored in a memory component (e.g., a memory circuit, a platter of a hard disk drive, a solid-state storage device, or a magnetic or optical disc) of a device having a processor and a dialogue hypothesis set 202, where the instructions, when executed on the processor, cause the device to operate according to the techniques presented herein. The exemplary method 400 begins at 402 and involves executing 404 the instructions on the processor of the device. In particular, the execution of the instructions on the processor causes the device to, for respective expressions 106 of the dialogue 104, apply 408 an expression recognizer (e.g., a speech recognizer or a language recognizer) and a natural language processor to the expression 106. This application enables the device to store 410 in the dialogue hypothesis set 202 at least one dialogue hypothesis 204 for the expression 106, where the respective dialogue hypotheses 204 respectively comprise at least one slot 212 that is associated with a subject 214 of the expression 106, and a hypothesis probability 206; and to, for respective previous dialogue hypotheses 204 in the dialogue hypothesis set 202 that were generated for a previous expression 106 of the dialogue 104, update 412 the subject 214 of the at least one slot 212 of the previous dialogue hypothesis 202.

The execution of the instructions on the processor also causes the device to, using a knowledge source 208, adjust 414 the hypothesis probabilities 206 of the respective dialogue hypotheses 204. The execution of the instructions on the processor also causes the device to rank 416 the dialogue hypothesis set 202 according to the adjusted hypothesis probabilities 206. The execution of the instructions on the processor also causes the device to determine whether a high-ranking dialogue hypothesis 204 exists that has a hypothesis probability 206 exceeding a hypothesis confidence threshold. If so, the execution of the instructions on the processor may cause the device to execute 420 an action 218 fulfilling the high-ranking dialogue hypothesis 204; and if not, then the device may await an additional expression 106 (optionally prompting the user 102 for additional expressions 106 providing more or clarifying information), and may then perform the evaluation 406 of the additional expressions 106. By generating and tracking the hypothesis probabilities 206 of a dialogue hypothesis set 202 in this manner, the execution of the instructions on the processor causes the device to evaluate the dialogue 104 with the user 102 in accordance with the techniques presented herein, and so the exemplary method 400 ends at 422.

Figure 5:
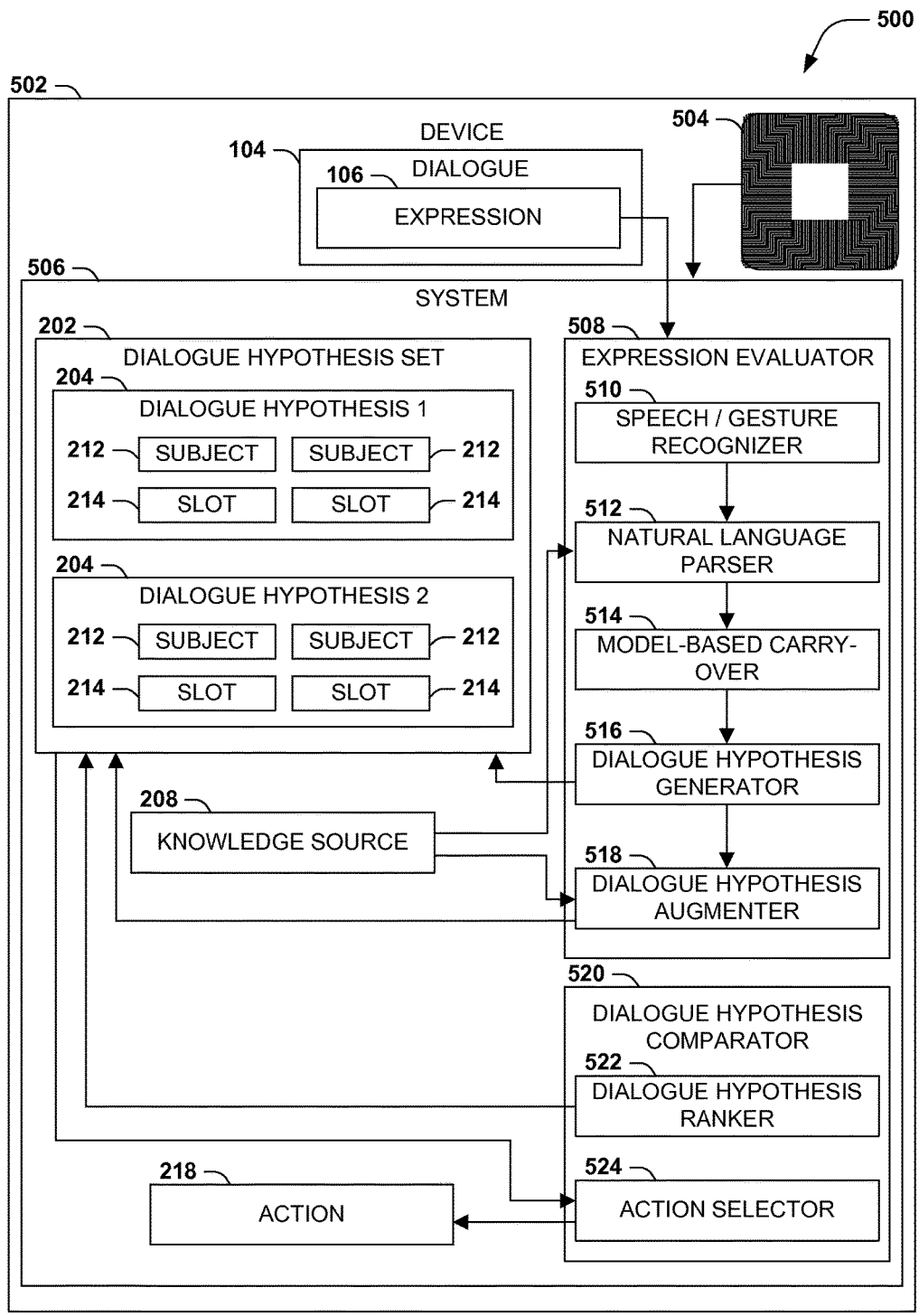
FIG. 5 is a component block diagram illustrating an exemplary system for evaluating a dialogue with a user in accordance with the techniques presented herein.

FIG. 5 presents an illustration of a third exemplary embodiment of the techniques presented herein, illustrated as an exemplary system 506 for evaluating a dialogue 104 with a user 102. One or more components of the exemplary system 506 may be implemented, e.g., as instructions stored in a memory component of a device 502 that, when executed on a processor 504 of the device 502, cause the device 502 to perform at least a portion of the techniques presented herein. Alternatively (though not shown), one or more components of the exemplary system 506 may be implemented, e.g., as a volatile or nonvolatile logical circuit, such as a particularly designed semiconductor-on-a-chip (SoC) or a configuration of a field-programmable gate array (FPGA), that performs at least a portion of the techniques presented herein, such that the interoperation of the components completes the performance of a variant of the techniques presented herein.

The exemplary system 506 includes a dialogue hypothesis set 202, comprising at least two dialogue hypotheses 204 respectively having at least one slot 214 with which a subject 212 of the dialogue 104 may be associated, and a hypothesis probability 206. The exemplary system 506 also includes an expression evaluator 508 that, for the respective expressions 106 of the dialogue 104, applies to the expression 106 a language recognizer (e.g., speech and/or gesture recognizer 510) that identifies the language elements (e.g., words 110) of the expression 106, and a natural-language parser 512 that organizes the language elements into a parsed expression 114 (e.g., a contextualized arrangement of words 110 in a sequence that matches a parts-of-speech pattern that is typical in the language of the expression 106). The expression evaluator 508 also includes a model-based carry-over comparator 514 that, for respective previous dialogue hypotheses 204 stored in the dialogue hypothesis set 202 in response to previously evaluated expressions 106, update the subject 212 of the at least one slot 214 of the previous dialogue hypothesis 204. The expression evaluator 508 also includes a dialogue hypothesis generator 516 that stores in the dialogue hypothesis set 202 at least two dialogue hypotheses 204, including the hypothesis probabilities 206 thereof. The expression evaluator 508 also includes a dialogue hypothesis augmenter 518 that, using a knowledge source 208, adjusts the hypothesis probabilities 206 of the respective dialogue hypotheses 204 of the dialogue hypothesis set 202.

The exemplary system also includes a dialogue hypothesis comparator 520, including a dialogue hypothesis ranker 522 that ranks the dialogue hypothesis set 202 according to the hypothesis probabilities 206, and an action selector 524 that, upon identifying a high-ranking dialogue hypothesis 204 having a hypothesis probability 206 that exceeds a hypothesis confidence threshold, executes an action 218 fulfilling the high-ranking dialogue hypothesis 204. In this manner, the architecture and interoperation of the components of the exemplary system 506 of FIG. 5 enable the device 502 to evaluate the dialogue 104 with the user 102 in accordance with the techniques presented herein.

Still another embodiment involves a computer-readable medium comprising processor-executable instructions configured to apply the techniques presented herein. Such computer-readable media may include, e.g., computer-readable storage devices involving a tangible device, such as a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD-R, DVD-R, or floppy disc), encoding a set of computer-readable instructions that, when executed by a processor of a device, cause the device to implement the techniques presented herein. Such computer-readable media may also include (as a class of technologies that are distinct from computer-readable storage devices) various types of communications media, such as a signal that may be propagated through various physical phenomena (e.g., an electromagnetic signal, a sound wave signal, or an optical signal) and in various wired scenarios (e.g., via an Ethernet or fiber optic cable) and/or wireless scenarios (e.g., a wireless local area network (WLAN) such as WiFi, a personal area network (PAN) such as Bluetooth, or a cellular or radio network), and which encodes a set of computer-readable instructions that, when executed by a processor of a device, cause the device to implement the techniques presented herein.

Figure 6:
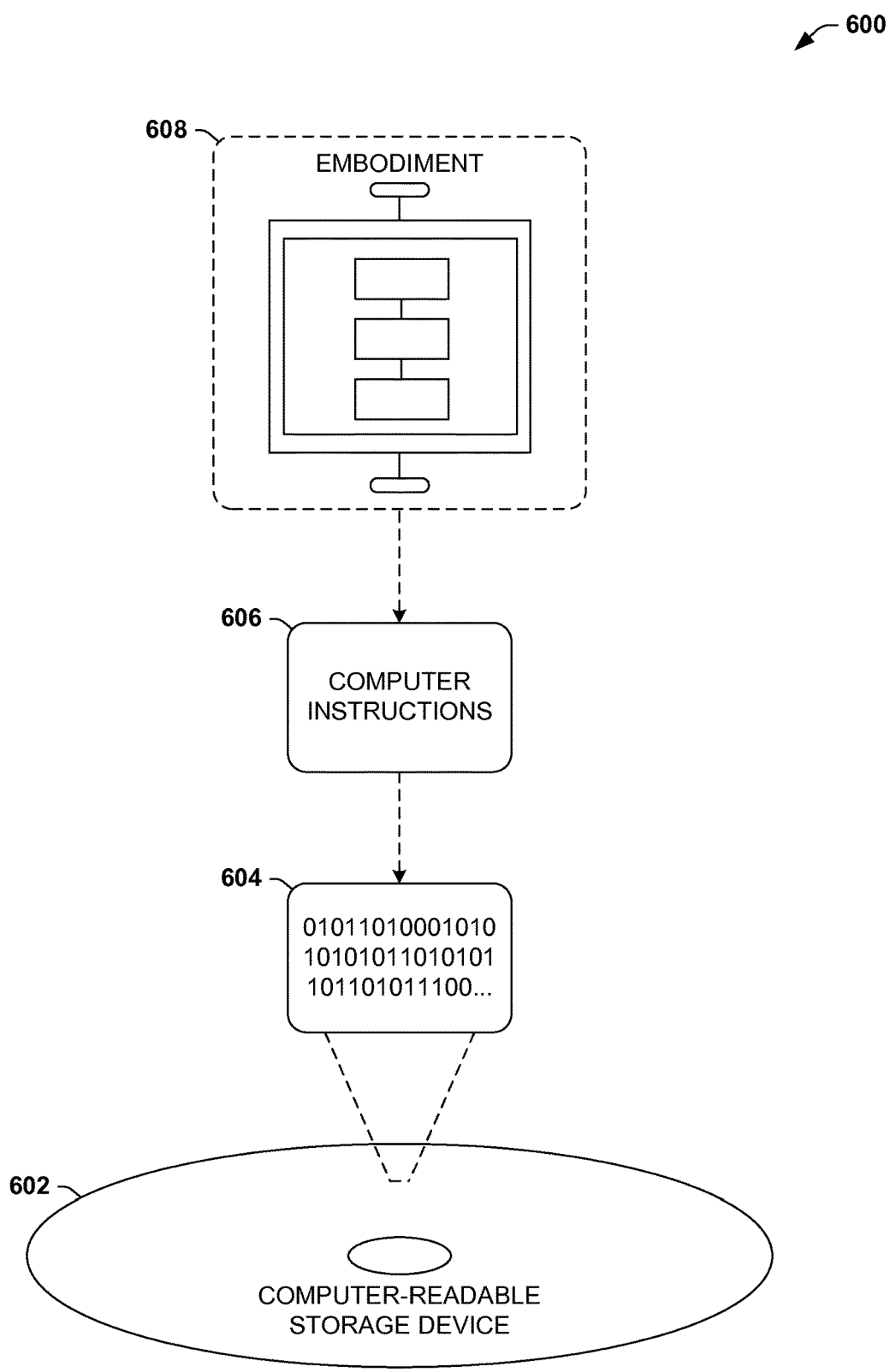
FIG. 6 is an illustration of an exemplary computer-readable medium including processor-executable instructions configured to embody one or more of the provisions set forth herein.

An exemplary computer-readable medium that may be devised in these ways is illustrated in FIG. 6, wherein the implementation 600 comprises a computer-readable storage device 602 (e.g., a CD-R, DVD-R, or a platter of a hard disk drive), on which is encoded computer-readable data 604. This computer-readable data 604 in turn comprises a set of computer instructions 606 configured to operate according to the principles set forth herein. In a first such embodiment, the processor-executable instructions 606 may be configured to cause a device to perform a method 608 of configuring a device to evaluate a dialogue 104 with a user 102, such as the exemplary method 300 of FIG. 3 or the exemplary method 400 of FIG. 4. In a second such embodiment, the processor-executable instructions 606 may be configured to implement one or more components of a system of evaluating a dialogue 104 with a user 102, such as the exemplary system 506 of FIG. 5. Some embodiments of this computer-readable medium may comprise a computer-readable storage device (e.g., a hard disk drive, an optical disc, or a flash memory device) that is configured to store processor-executable instructions configured in this manner. Many such computer-readable media may be devised by those of ordinary skill in the art that are configured to operate in accordance with the techniques presented herein.

E. VARIATIONS

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the exemplary method 300 of FIG. 3; the exemplary method 400 of FIG. 4; the exemplary system 506 of FIG. 5; and the exemplary computer-readable storage device 602 of FIG. 6) to confer individual and/or synergistic advantages upon such embodiments.

E1. Scenarios

A first aspect that may vary among embodiments of these techniques relates to the scenarios wherein such techniques may be utilized.

As a first variation of this first aspect, the dialogue evaluation techniques presented herein may be implemented on many types of devices, such as a workstation or server; a laptop, tablet, or palmtop portable computer; a communicator, such as a phone or text messaging device; a media player, such as a portable music player or a television; a gaming device, such as a game console or a portable game player; and/or a wearable computing device, such as an earpiece or a pair of glasses. Additionally, the techniques presented herein may be implemented across a set of devices, such as a client device that receives the expressions 106 from the user 102 and forward the expressions 106 to a server providing a dialogue evaluation service, which may evaluate the dialogue 104 and indicate to the client device the actions 218 to be executed in fulfillment of the dialogue 104, or a set of peer devices that interoperate to collect and to evaluate the expressions of the user 102 (e.g., a set of devices positioned around a residence or office of the user 102 that enable a continuous and consistent dialogue 104 as the user 102 moves throughout the residence or office).

As a second variation of this first aspect, the respective components of an embodiment of the techniques presented herein (e.g., the expression evaluator 508, the speech and/or gesture recognizer 510, the language parser 512, the model-based carry-over comparator 514, the dialogue hypothesis generator 516, the dialogue hypothesis augmenter 518, the expression evaluator 520, the dialogue hypothesis ranker 522, and/or the action selector 524 in the exemplary system 506 of FIG. 5) may be developed in many ways. As a first such example, such components may comprise a collection of rules developed by users, optionally including the user 102 of the device 502, that perform various aspects of the evaluation of the dialogue 104. As a second such example, such components may include various machine learning techniques, such as artificial neural networks, Bayesian classifiers, and/or genetically derived algorithms, that have been developed through training with annotated training sets. As a third such example, such components may include a "mechanical Turk" aspect, wherein difficult-to-evaluate data sets are forwarded to humans who may respond with the correct results of evaluation to be used by the device for the current evaluation and/or the future evaluation of similar types of expressions 106. Such components may also be implemented as a combination of such techniques, e.g., an artificial neural network that is also constrained by a set of rule-based heuristics.

As a third variation of this first aspect, a device may receive and evaluate expressions 106 provided by the user 102 in a variety of languages, including one or more natural languages (e.g., English, French, and German); one or more regional or contextual language dialects (e.g., a casual speaking style and a formal speaking style); and/or one or more technical languages (e.g., a programming language, or a grammatically constrained language that is adapted for interaction with a particular type of device). Additionally, the expressions 106 may also be provided in a nonverbal language, such as physical language elements with various body parts (e.g., hand signals or body language), and/or an accessibility language that enables interaction with users 102 according to their physical capabilities. The user 102 may also utilize a combination of such languages (e.g., physically pointing at an entry on a display while saying, "show me that one"). The device may therefore comprise, e.g., a camera that detects a physical gesture of the user 102, and a gesture recognizer that identifies an expression 104 indicated by the physical gesture. A device may also include a language identifier that identifies the language of the expression 104, and/or a language translator that translates the expression 104 from the language of the user 102 into a second language that the device is capable of evaluating, and/or that translates textual or vocalized output into the language of the user 102. These and other scenarios and resources may be compatible with and adaptable to various implementations of the dialogue evaluation techniques presented herein.

E2. Language Parsing

A second aspect that may vary among embodiments of the techniques presented herein involves the application of language parsing to an expression 106 of the dialogue 104 with the user 102.

As a first variation of this second aspect, language parsing may be facilitated with reference to a language model, such as a carry-over model that identifies language patterns in the language of the dialogue 104. For example, a language model may indicate that a first expression 104 initiating a request may often be followed by subsequent expressions 104 that modify the request, such as a first expression that alters the one or more subjects 214 (e.g., "show me action movies . . . now how about comedies?"); a second expression that filters the one or more subjects (e.g., "show me action movies . . . show me the second one"); and a third expression that navigates among options ("show me movies . . . show me music . . . let's go back to movies"). The language patterns within these forms of dialogue may inform the language parsing, and may be implemented, e.g., in a model-based carry-over comparator that suggests rules for transitions between expressions 104 and the corresponding transformation of dialogue hypotheses 204.

As a second variation of this second aspect, a device 502 may utilize a slot- and subject-based approach to representing the dialogue hypotheses 204, which may facilitate the flexibility of the updating of dialogue hypotheses 204 in response to the evaluation of subsequent expressions 106 of the dialogue 104. For example, upon receiving from the user 102 an expression 106 in the context of the dialogue 104, parse the expression 108 into one or more dialogue hypotheses 204 respectively comprising one or more slots 214 respectively associated with a subject 212 of the expression 106. For example, a language parser 512 may identify the language pattern "subject-verb-object" in the language of the expression 106, and may respectively associate a first noun subject 212, a verb subject 212, and a second noun subject 212 in the corresponding sequence of the expression 106 to the respective slots 214 of the dialogue hypothesis 204. Additionally, a language parser 512 may update a previous dialogue hypothesis 204 by replacing a previous subject 212 of the dialogue with a substitute subject 212. As a first such example, the language parser 512 may replace a current knowledge domain within the knowledge source for an alternative knowledge domain within the knowledge source that is different from the current knowledge domain (e.g., a request for information about a movie, which may be fulfilled by reference to a movie database, may be replaced with a request for information about the musical score in an audio soundtrack of the movie, which may be fulfilled by reference to a music database). As a second such example, the language parser 512 may replace a subject genus within a current knowledge domain of the knowledge source 208 with a subject species within the subject genus within the current knowledge domain (e.g., transitioning from a request for information about movies in the "action" movie genre to a request for information about a specific movie in the "action" movie genre). As a third such example, the language parser 512 may replace a selected action 218 to be applied to a second subject of the dialogue hypothesis 204 (i.e., the action 218 to be executed if the hypothesis probability 206 of the dialogue hypothesis 204 is determined to exceed a hypothesis confidence threshold) with an alternative action that is different from the selected action (e.g., transitioning from a request to show information about a movie to a request to view the movie). These and other language parsing techniques may facilitate the evaluation of dialogue 104 with the user 102 in accordance with the techniques presented herein.

E3. Dialogue Hypothesis Generation and Ranking

A third aspect that may vary among embodiments of the techniques presented herein relates to the manner of assigning hypothesis probabilities 206 to dialogue hypotheses 204, and/or of ranking the dialogue hypotheses 204 of the dialogue hypothesis set 202.

As a first variation of this third aspect, many types of ranking techniques may be utilized, such as an "N-best" list, a priority queue, a Gaussian distribution, or a histogram (e.g., a histogram identifying trends in the hypothesis probabilities 206 of the respective dialogue hypotheses 204).

As a second variation of this third aspect, many aspects may be used to formulate and/or compare the dialogue hypotheses 204, as well as to estimate the hypothesis probabilities 206. For example, the techniques presented herein may achieve the formulation, estimation, and/or comparison of dialogue hypotheses using discriminative approaches based on a conditional probability distribution among the dialogue hypotheses 204, and/or using generative approaches involving a joint probability distribution of potential dialogue hypotheses 204.

As a third variation of this third aspect, many techniques may be used to assign the hypothesis probability 206 to a dialogue hypothesis 204. For example, a dialogue 104 may comprise at least two expressions 106 of the user 102, and the hypothesis probabilities 206 may be selected and/or updated in view of the sequence of expressions 106 of the dialogue 104 (e.g., the entire sequence, or a recent portion thereof, may be reevaluated to verify that the dialogue hypothesis 204 satisfies the sequence of expressions 106, not just the set of expressions 106 evaluated individually and in isolation).

As a fourth variation of this third aspect, the hypothesis probability 206 of a dialogue hypothesis 204 may be identified either in relation to the other dialogue hypotheses 204 (e.g., the current highest dialogue hypothesis of the dialogue hypothesis set 202); in relation to an objective standard (e.g., a 0-to-100 hypothesis probability scale); and/or in relation to a model (e.g., a probability tier or standard deviation range within a hypothesis probability distribution).

As a fifth variation of this third aspect, various techniques may be utilized to determine when a dialogue hypothesis 204 is sufficiently probable that an action 218 is to be executed in fulfillment of the dialogue hypothesis 204 (e.g., when the hypothesis probability 206 of the dialogue hypothesis 204 exceeds a hypothesis confidence threshold; when the hypothesis probability 206 exhibits a sharply positive trend; and/or when the hypothesis probability 206 sufficiently exceeds the hypothesis probabilities 206 of the other dialogue hypotheses 204 by a threshold margin). Alternatively or additionally, various techniques may be utilized to determine when a dialogue hypothesis 204 is sufficiently improbable that the dialogue hypothesis 204 is to be discarded (e.g., when the hypothesis probability 206 of the dialogue hypothesis 204 is reduced below a hypothesis retention threshold; when the hypothesis probability 206 exhibits a sharply negative trend; and/or when the hypothesis probability 206 is sufficiently below the hypothesis probabilities 206 of the other dialogue hypotheses 204 by a threshold margin).

As a sixth variation of this third aspect, some expressions 106 of the user 102 may directly affect the assignment, adjustment, and/or ranking of hypothesis probabilities 206 of respective dialogue hypotheses 204. As a first such example, upon identifying an expression 106 of the user 102 that declines a high-ranking dialogue hypothesis 204 (e.g., "not that one"), an embodiment may reduce the hypothesis probability 206 of the high-ranking dialogue hypothesis 204, thereby enabling less probable dialogue hypotheses 206 that may more accurately reflect the intentions of the user 102 to be exposed and/or acted upon. As a second such example, upon identifying at least two high-ranking dialogue hypotheses 204 respectively having a hypothesis probability 206 that are within a hypothesis proximity range (e.g., a "tie") and that may be difficult to disambiguate, an embodiment may present to the user 102 a disambiguation query (e.g., "did you mean that you want to see comedy movies instead of action movies, or comedy movies that are also action movies?"); and upon receiving a response to the disambiguation query from the user 102, the embodiment may adjust the hypothesis probabilities 206 of the respective dialogue hypotheses 204 in view of the response. Many such variations in the assignment, adjustment, and/or ranking of hypothesis probabilities 206 to the dialogue hypotheses 204 may be utilized in embodiments of the techniques presented herein.

E4. Knowledge Sources

A fourth aspect that may vary among embodiments of the techniques presented herein involves the nature, contents, and uses of the knowledge source 208 of the device(s) in the evaluation of dialogue 104 with the user 102.

As a first variation of this fourth aspect, the device(s) upon which the techniques are implemented may utilize many types of knowledge sources 208. As a first example, the knowledge source 208 may include a user profile of the user 102 (e.g., a social network profile), which may indicate interest and tastes in various topics that may arise in the dialogue 104, and may therefore facilitate more accurate assignment of hypothesis probabilities 206 of the dialogue hypotheses 204. As a second such example, the knowledge source 208 may include an execution of an earlier action 218 in response to an earlier dialogue 104 with the user 102 (e.g., the types of requests that the user 102 has requested in the past, and the actions 218 executed in response to such requests). As a third such example, the knowledge source 208 may include a current environment of the device (e.g., the physical location of the device may provide information that informs the evaluation of the dialogue 104 with the user 102).

As a second variation of this fourth aspect, an embodiment may enable the knowledge source 208 to be expanded by the addition of new knowledge domains; e.g., the device 502 may communicate with a new source of media (e.g., a source of streamed television content) that provides one or more subjects 212 (e.g., the names of television shows) and/or one or more actions 218 (e.g., "play television show"; "describe television show"; and "subscribe to television show"), and may therefore add the subjects 212 and/or actions 218 of the new knowledge domain to the knowledge source in order to expand the dialogue fulfillment capabilities of the device 502.

As a third variation of this fourth aspect, an embodiment may utilize the knowledge source 208 while performing several elements of the evaluation of the expression 106 and the dialogue 104. As a first such example, the knowledge source 208 may supplement a speech and/or gesture recognizer 510; e.g., a movie database may provide the names and pronunciation of popular movie titles and actor names that may be spoken by a user 102. As a second such example, the knowledge source 208 may supplement a language parser 512; e.g., a movie database may specify language patterns that are associated with queries that may be spoken by a user 102, such as "what movies featured (actor name)?", that may facilitate the organization of language elements into a parsed expression 116. As a third such example, the knowledge source 208 may inform a model-based carry-over comparator 514, the dialogue hypothesis generator 516, and/or the dialogue hypothesis augmenter 518. For example, from a large user profile that describes a large amount of detail about the user 102, the model-based carry-over comparator 514 may identify and distinguish included facts 210 that are relevant to an expression 106, and/or an estimation of the hypothesis probability 206 and/or the ranking of the dialogue hypotheses 204, from excluded facts 210 that are not related to the expression 106, estimation of hypothesis probabilities 206, and/or ranking of dialogue hypotheses 204 (e.g., the evaluation of an expression 106 concerning a movie genre may include facts 210 about the movies in the genre that the user 102 has recently viewed, and may exclude facts 210 about the user's interests in movie soundtracks that may be not be deemed relevant to the evaluation). These and other techniques for generating and using a knowledge source 208 may be included in variations of the techniques presented herein.

E5. Error Recovery

A fifth aspect that may vary among embodiments of these techniques involves the manner of responding to errors that may arise during the evaluation of the expressions 106 and dialogue 104 with the user 102.

As a first variation of this fifth aspect, if an embodiment Identifies an error in response to an action 218 fulfilling a high-ranking dialogue hypothesis 204, the embodiment may reduce the hypothesis probability 206 of the high-ranking dialogue hypothesis 204. For example, if the user provides a request such as "show me the movie Faction," but no such movies are found in a movie database because the identified media is actually a television show, then the reduction of the dialogue hypothesis 204 for the high-ranking dialogue hypothesis 204 relating to movies may be reduced in order to expose the lower-ranking but more probable dialogue hypothesis 204 relating to television shows. Alternatively or additionally, the embodiment may, upon identifying the failure while executing the action 218 for the high-ranking dialogue hypothesis 204, report to the user 102 an action error indicating the failure of the action 218 (e.g., "no movies found with the title "Faction").

As a second variation of this fifth aspect, an embodiment may respond to different types of errors in a different manner, which may indicate to the user the source of difficulty in evaluating the dialogue 104. For example, an embodiment may, upon identifying a failure to parse an expression 106 of the dialogue 104, report a parsing error to the user 102 that indicates the failure to parse the expression 106, where the parsing error is different than an action error indicating a failure of an action. Additionally, where the error arises in a speech/gesture recognizer that identifies language elements of the expression 106, the embodiment may present an expression recognizer error indicating to the user 102 indicating a failure to recognize the expression 106; and where the error arises in a language parser that parses the expression elements to generate a dialogue hypothesis 204, the embodiment may present a language parsing error (that is different from the expression recognizer error) indicating to the user 102 the failure to parse the expression 104.

Figure 7:
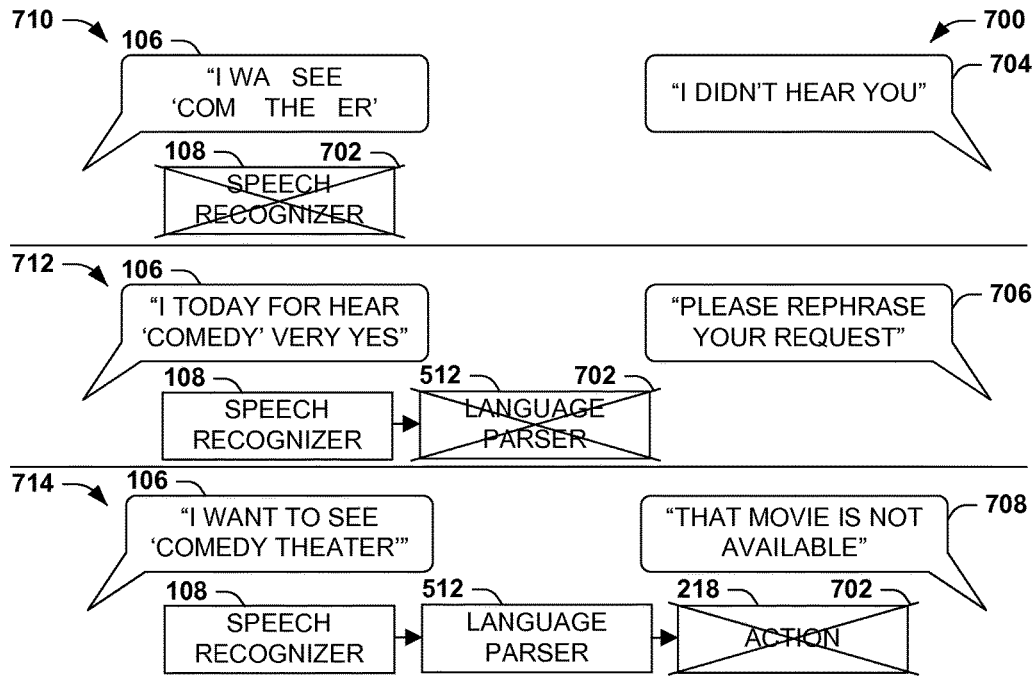
FIG. 7 is an illustration of an exemplary scenario featuring variations in the communication of errors to the user in accordance with a variation of the techniques presented herein.

FIG. 7 presents an illustration 700 of a set of examples of various types of error messages arising in various components of the dialogue evaluation pipeline. In a first example 710, a first expression 106 is submitted where the user 102 is too far from a microphone, and only portions of words 110 may be detected by a speech recognizer 108. Upon detecting the failure 702 of the speech recognizer 108 to detect the words 110, the embodiment may generate an expression recognizer error 704, such as "I didn't hear you." In a second example 712, a second expression 106 is submitted comprising a set of words 110 that are individually recognizable, but that are not coherent as a phrase of the English language (e.g., "I today for hear comedy very yes"). Upon detecting a success of a speech recognizer 108 but a failure 702 of a language parser 512 to parse the expression 106, the embodiment may present to the user 102 a parsing error 706 (e.g., "I didn't understand your question; please rephrase your request"). In a third example 714, upon receiving a third expression 106 that is both recognizable and parseable but that is not actionable (e.g., a request for a movie for which the embodiment has no information), the embodiment may identify the success of the speech recognizer 108 and the language parser 512 but the failure of the action 218, and may therefore present to the user 102 an action error 708 (e.g., "that movie is not available"). In this manner, the embodiment may notify the user 102 of the type of error encountered while evaluating the dialogue 104 with the user.

Figure 8:
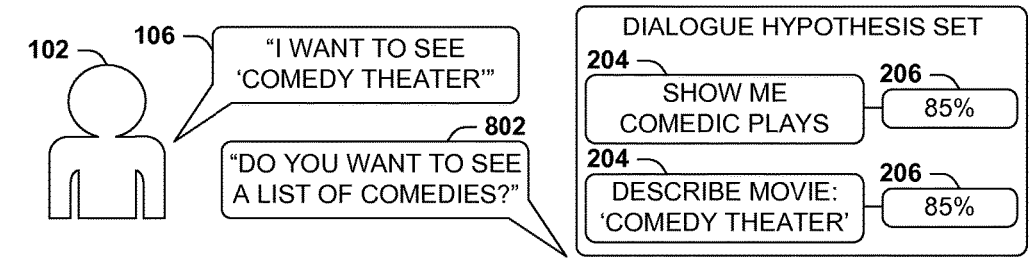
FIG. 8 is an illustration of an exemplary scenario featuring an evaluation of a dialogue hypothesis set in view of a sequence of expressions received from the user and comprising a dialogue in accordance with the techniques presented herein.

FIG. 8 presents an illustration of an exemplary scenario 800 featuring variations in several aspects of the techniques presented herein. At a first time point 804, a user 102 initiates a dialogue 104 with an embodiment using a first expression 106. A dialogue hypothesis set 202 may be generated with at two dialogue hypotheses 204 respectively having a hypothesis probability 206, but the hypothesis probabilities may be too close to act on one with confidence (e.g., it may not be clear whether the user is asking to see a list of comedies, or is asking about a specific comedy title). The embodiment may therefore present a disambiguation query 802 that prompts the user 102, at a second time point 806, to provide a second expression 106 that disambiguates the dialogue hypotheses 204, i.e., selecting a second dialogue hypothesis 204 (for which the hypothesis probability 206 is increased) over a first dialogue hypothesis 204 (for which the hypothesis probability 206 is reduced). The first dialogue hypothesis 204 may be provisionally retained in the dialogue hypothesis set 202, in case the user 102 changes the dialogue 104 to request the first dialogue hypothesis 204. However, the hypothesis probability 206 of the second dialogue hypothesis 204 may be associated with at least two actions 218, such as a request to view details about the movie (e.g., "I want to see this film" as a general expression of interest, or "I want to see this film" as a request directed to the embodiment to present the film). The embodiment may therefore execute a first action 218, such as presenting a description of the movie in which the user 102 appears to be interested. At a third time 808, the user 102 may present a third expression 106 requesting a different action 218, such as playing the movie for the user 102, and the embodiment may accordingly adjust the hypothesis probabilities 206 of the dialogue hypotheses 204 and execute the action 218 associated with the dialogue hypothesis 204 having the highest adjusted hypothesis probability 206. Notably, the second and third expressions 106 may be difficult to understand or act upon in isolation; their semantic value may only be evaluated by the system in the context of the dialogue 104 comprising the sequence of expressions including the first expression 106. Various embodiments may incorporate many such variations of the techniques presented herein.

F. COMPUTING ENVIRONMENT

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments to confer individual and/or synergistic advantages upon such embodiments.

Figure 9:
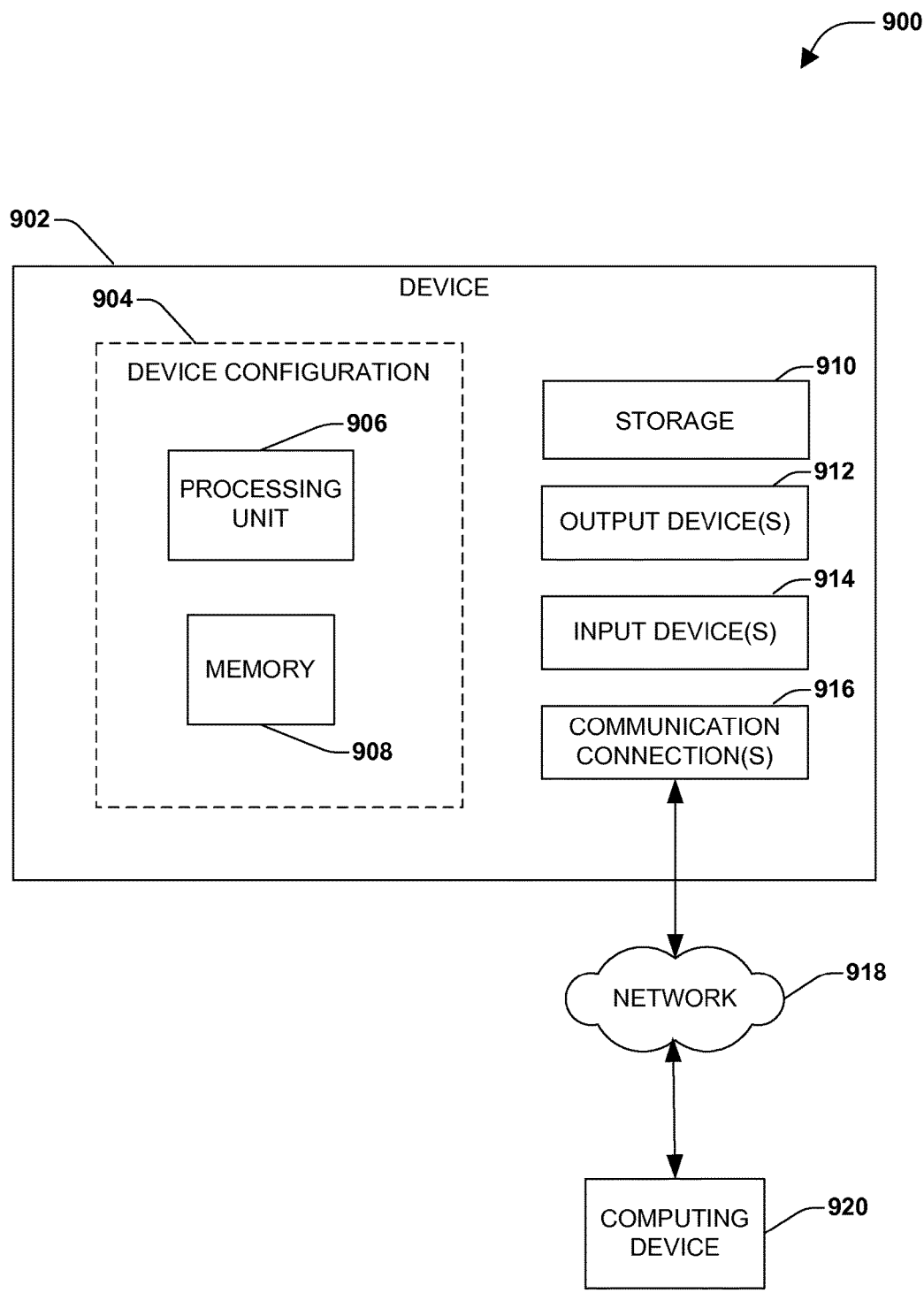
FIG. 9 is an illustration of an exemplary computing environment wherein a portion of the present techniques may be implemented and/or utilized.

FIG. 9 and the following discussion provide a brief, general description of a suitable computing environment to implement embodiments of one or more of the provisions set forth herein. The operating environment of FIG. 9 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 9 illustrates an example of a system 900 comprising a computing device 902 configured to implement one or more embodiments provided herein. In one configuration, computing device 902 includes at least one processing unit 906 and memory 908. Depending on the exact configuration and type of computing device, memory 908 may be volatile (such as RAM, for example), non-volatile (such as ROM, flash memory, etc., for example) or some combination of the two. This configuration is illustrated in FIG. 9 by dashed line 904.

In other embodiments, device 902 may include additional features and/or functionality. For example, device 902 may also include additional storage (e.g., removable and/or non-removable) including, but not limited to, magnetic storage, optical storage, and the like. Such additional storage is illustrated in FIG. 9 by storage 910. In one embodiment, computer readable instructions to implement one or more embodiments provided herein may be in storage 910. Storage 910 may also store other computer readable instructions to implement an operating system, an application program, and the like. Computer readable instructions may be loaded in memory 908 for execution by processing unit 906, for example.

The term "computer readable media" as used herein includes computer storage media. Computer storage media includes volatile and nonvolatile, removable and non-removable media implemented in any method or technology for storage of information such as computer readable instructions or other data. Memory 908 and storage 910 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 902. Any such computer storage media may be part of device 902.

Device 902 may also include communication connection(s) 916 that allows device 902 to communicate with other devices. Communication connection(s) 916 may include, but is not limited to, a modem, a Network Interface Card (NIC), an integrated network interface, a radio frequency transmitter/receiver, an infrared port, a USB connection, or other interfaces for connecting computing device 902 to other computing devices. Communication connection(s) 916 may include a wired connection or a wireless connection. Communication connection(s) 916 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 902 may include input device(s) 914 such as keyboard, mouse, pen, voice input device, touch input device, infrared cameras, video input devices, and/or any other input device. Output device(s) 912 such as one or more displays, speakers, printers, and/or any other output device may also be included in device 902. Input device(s) 914 and output device(s) 912 may be connected to device 902 via a wired connection, wireless connection, or any combination thereof. In one embodiment, an input device or an output device from another computing device may be used as input device(s) 914 or output device(s) 912 for computing device 902.

Components of computing device 902 may be connected by various interconnects, such as a bus. Such interconnects may include a Peripheral Component Interconnect (PCI), such as PCI Express, a Universal Serial Bus (USB), Firewire (IEEE 1394), an optical bus structure, and the like. In another embodiment, components of computing device 902 may be interconnected by a network. For example, memory 908 may be comprised of multiple physical memory units located in different physical locations interconnected by a network.

Those skilled in the art will realize that storage devices utilized to store computer readable instructions may be distributed across a network. For example, a computing device 920 accessible via network 918 may store computer readable instructions to implement one or more embodiments provided herein. Computing device 902 may access computing device 920 and download a part or all of the computer readable instructions for execution. Alternatively, computing device 902 may download pieces of the computer readable instructions, as needed, or some instructions may be executed at computing device 902 and some at computing device 920.

G. USE OF TERMS

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method of evaluating a dialogue with a user on a device having a processor, the method comprising:
executing on the processor instructions causing the device to:
generate a dialogue hypothesis set comprising at least two dialogue hypotheses respectively having a hypothesis probability;
rank the dialogue hypothesis set according to the hypothesis probabilities;
after the ranking, upon identifying a low-ranking dialogue hypothesis having a hypothesis probability below a hypothesis retention threshold, discard the low-ranking dialogue hypothesis;
in response to the discarding, adjust the hypothesis probabilities of the respective dialogue hypotheses using a knowledge source;

after the adjusting, re-rank the dialogue hypothesis set according to the hypothesis probabilities; and
for a high-ranking dialogue hypothesis having a hypothesis probability exceeding a hypothesis confidence threshold, execute an action fulfilling the high-ranking dialogue hypothesis, wherein executing the action comprises presenting to the user information associated with the high-ranking dialogue hypothesis.

2. The method of claim 1, wherein the instructions, when executed on the processor, further cause the device to, upon identifying at least two high-ranking dialogue hypotheses respectively having a hypothesis probability within a hypothesis proximity range:
present to the user a disambiguation query; and
upon receiving from the user a response to the disambiguation query, adjust the hypothesis probability of the respective at least two high-ranking dialogue hypotheses in view of the response.

3. The method of claim 1, wherein:
the dialogue comprises at least two expressions of the user; and
adjusting the hypothesis probabilities further comprises: for the respective dialogue hypotheses, adjust the hypothesis probability in view of the at least two expressions of the user.

4. The method of claim 1, wherein adjusting the hypothesis probabilities further comprises: upon identifying an expression of the user that declines the high-ranking dialogue hypothesis, reducing the hypothesis probability of the high-ranking dialogue hypothesis.

5. The method of claim 1, wherein the knowledge source is selected from a knowledge source set comprising:
a user profile of the user;
an execution of an earlier action in response to an earlier dialogue with the user; and
a current environment of the device.

6. The method of claim 1, wherein the instructions further cause the device to, upon receiving a knowledge domain comprising at least one subject and at least one action, add the at least one subject and the at least one action of the knowledge domain to the knowledge source.

7. A computer-readable memory device not consisting of a propagated data signal, the computer-readable memory device storing instructions that, when executed on a processor of a device, cause the device to evaluate a dialogue with a user, by:
generating a dialogue hypothesis set comprising at least two dialogue hypotheses respectively having a hypothesis probability;
ranking the dialogue hypothesis set according to the hypothesis probabilities;
after the ranking, upon identifying a low-ranking dialogue hypothesis having a hypothesis probability below a hypothesis retention threshold, discarding the low-ranking dialogue hypothesis;
in response to the discarding, adjust the hypothesis probabilities of the respective dialogue hypotheses using a knowledge source;
after the adjusting, re-rank the dialogue hypothesis set according to the hypothesis probabilities; and
for a high-ranking dialogue hypothesis having a hypothesis probability exceeding a hypothesis confidence threshold, execute an action fulfilling the high-ranking dialogue hypothesis, wherein executing the action comprises presenting to the user information associated with the high-ranking dialogue hypothesis.

8. The computer-readable memory device of claim 7, wherein the instructions, when executed on the processor, further cause the device to, upon identifying an error in response to an action fulfilling the high-ranking dialogue hypothesis, reduce the hypothesis probability of the high-ranking dialogue hypothesis.

9. The computer-readable memory device of claim 8, wherein the instructions, when executed on the processor, further cause the device to, upon identifying a failure while executing the action for the high-ranking dialogue hypothesis, report to the user an action error indicating the failure of the action.

10. The computer-readable memory device of claim 9, wherein the instructions, when executed on the processor, further cause the device to:
upon receiving an expression of the dialogue, evaluate the expression of the dialogue according to an expression evaluator to generate at least one dialogue hypothesis involving the expression; and
upon identifying a failure to parse the expression of the dialogue according to the expression evaluator, report to the user a parsing error indicating the failure to parse the expression of the dialogue, where the parsing error is different than the action error.

11. The computer-readable memory device of claim 10, wherein:
the expression evaluator further comprises:
a language recognizer that identifies at least one language element of the expression, and
a language parser that parses the expressions to generate the dialogue hypothesis; and
the parsing error is selected from a parsing error set comprising:
an expression recognizer error indicating to the user a failure to recognize the expression; and
a language parsing error indicating to the user a failure to parse the expression, where the language parsing error is different from the expression recognizer error.

12. A system for evaluating a dialogue with a user on a device having a processor and a memory, the system comprising:
a dialogue hypothesis set;
an expression evaluator comprising instructions stored in the memory that, when executed on the processor, cause the device to, for respective expressions of the dialogue:
apply an expression recognizer and a natural language processor to:
upon receiving from the user an expression replacing a previous subject of the dialogue with a substitute subject, store in the dialogue hypothesis set at least one dialogue hypothesis of the expression, the at least one dialogue hypothesis respectively comprising:
at least one slot associated with the substitute subject of the expression, and
a hypothesis probability; and
for respective previous dialogue hypotheses in the dialogue hypothesis set that were generated for a previous expression of the dialogue, update the previous subject of at least one previous dialogue hypothesis with the substitute subject; and
in response to updating the previous subject of the at least one slot, adjust the hypothesis probabilities of the respective dialogue hypotheses using a knowledge source; and a dialogue hypothesis comparator comprising instructions stored in the memory that, when executed on the processor, cause the device to:
rank the dialogue hypothesis set according to the hypothesis probabilities;
discard a low-ranking dialogue hypothesis from the dialogue hypothesis set;
adjust the hypothesis probabilities of the dialogue hypothesis set; and
for a high-ranking dialogue hypothesis having a hypothesis probability exceeding a hypothesis confidence threshold, execute an action fulfilling the high-ranking dialogue hypothesis, wherein executing the action comprises presenting to the user information associated with the high-ranking dialogue hypothesis.

13. The system of claim 12, wherein:
the previous subject further comprises a current knowledge domain within the knowledge source; and
the substitute subject further comprises an alternative knowledge domain within the knowledge source that is different from the current knowledge domain.

14. The system of claim 12, wherein:
the previous subject further comprises a subject genus within a current knowledge domain of the knowledge source; and
the substitute subject further comprises a subject species within the subject genus within the current knowledge domain.

15. The system of claim 12, wherein:
the previous subject further comprises a selected action to be applied to a second subject of the dialogue hypothesis; and
the substitute subject further comprises an alternative action to be applied to the second subject of the dialogue hypothesis, where the alternative action is different from the selected action.

16. The system of claim 12, wherein the expression evaluator further comprises:
a language recognizer that identifies at least one language element in the expression, and
a language parser that parses the expressions to generate the dialogue hypothesis.

17. The system of claim 16, wherein the language recognizer further comprises:
a camera that detects a physical language element of the user; and
a language recognizer that identifies an expression indicated by the physical language element.

18. The system of claim 16, wherein the language parser parses the expressions in view of the knowledge source.

19. The system of claim 18, wherein the language parser:
retrieves from the knowledge source at least one included fact that is related to the expression and excludes at least one excluded fact that is not related to the expression; and
parses the expression in view of the at least one included fact to generate the dialogue hypothesis.

20. The method of claim 1, wherein the instructions further cause the device to, upon identifying an error in response to an action fulfilling the high-ranking dialogue hypothesis, reduce the hypothesis probability of the high-ranking dialogue hypothesis.

* * * * *